Figures 1, 2, 3:
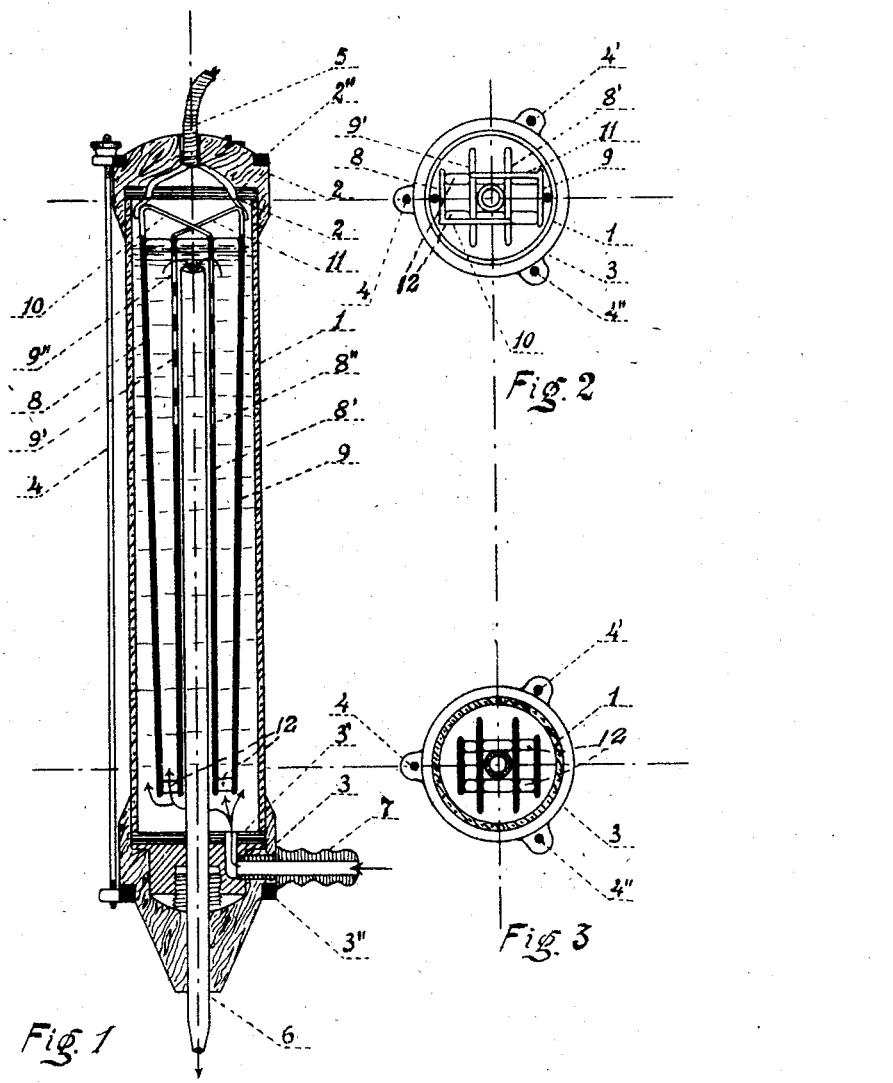

R. C. MASSERONI.
THERMOELECTRIC APPARATUS FOR HEATING FLOWING LIQUIDS.
APPLICATION FILED FEB. 16, 1921.

1,436,889.

Patented Nov. 28, 1922.

Inventor
Rinaldo Carlo Masseroni
By
Attorney.

Patented Nov. 28, 1922.

1,436,889

UNITED STATES PATENT OFFICE.

RINALDO CARLO MASSERONI, OF MILAN, ITALY.

THERMOELECTRIC APPARATUS FOR HEATING FLOWING LIQUIDS.

Application filed February 16, 1921. Serial No. 445,402.

*To all whom it may concern:*

Be it known that I, RINALDO CARLO MASSERONI, subject of the King of Italy, residing at Milan, Kingdom of Italy, have invented certain new and useful Improvements in Thermoelectric Apparatus for Heating Flowing Liquids, of which the following is a specification.

The present invention relates to a thermoelectric apparatus, adapted to heat liquids flowing therethrough by the aid of electric currents, preferably alternating currents, passing through the said liquid, the currents being conducted and collected by electrodes arranged in pairs in the liquid.

The accompanying drawing shows in Fig. 1 a longitudinal section and in Figs. 2 and 3 transverse sections of one form of construction given by way of example, in which it is assumed that a monophase current is used, and in which two pairs of electrodes are inserted in the circuit, the pairs being arranged in parallel with one another.

The apparatus comprises an insulating tube 1 closed by two caps 2 and 3 provided with suitable packings to render the apparatus water-tight and united one with another by means of rods or bolts 4, 4′, 4″ passing through eyes in insulating rings 2″, 3″ attached to said caps. Through one of the caps pass conducting leads 5 and through the other passes the tube 6 for drawing off the hot water, and in the same cap is mounted the tube 7 through which the cold water is allowed to enter.

The tube 6 rises within the apparatus to within a certain distance from the upper end or cap and it may be slid up or down in the apparatus so as to regulate this distance. Around the said tube are mounted the metallic plates 8, 8′, 9, 9′ connected to one another by means of the bridge pieces 10 and 11, each of which bridges is connected with one of the leads 5. The metal plates or electrodes form the couples 8 9′, 8′ 9 between which the current passes through the liquid; they may be arranged parallel or at an angle to the axis of the tube 1, and in the latter case they cause the liquid to eddy slightly and thus improve the action of the apparatus.

The inner electrodes 8′, 9′ are furnished with holes 8″, 9″ so as to facilitate the circulation of the liquid towards the upper opening of the tube 6. The distance between the electrode couples is assured by small insulating blocks 12 suitably disposed at the lower ends of the electrodes and having any desired dimensions. The number of electrode couples can be varied as desired and there may be employed, for example, three couples each one of which may be connected to one of the leads of a three phase supply.

The liquid entering at 7 rises in the tube 1 and is heated by the action of the currents passing between the electrodes forming the couples; the liquid rises just above the opening in the top of the tube 6 down which it descends to the outflow. By pushing in or drawing out the said tube the height to which the liquid rises in the tube 1 can be varied and consequently the extent of the moistened surfaces of the electrodes; the apparatus can thus be regulated to suit various currents and to suit liquids of various conductivities.

The shape, arrangement and material of the parts composing the apparatus can be varied without departing from the spirit of the invention.

Having now particularly described and ascertained the nature of my said invention, and in what manner the same is to be performed, I declare that what I claim is:

1. An electric heater for flowing liquids, comprising a vertically-arranged, tubular casing closed at opposite ends and provided adjacent its lower end with an inlet for the cold liquid; at least one electrode couple disposed substantially vertically within the casing, the members thereof having current-conducting means connected to their upper ends; and an open-ended, vertical discharge tube for the heated liquid extending upwardly through the lower end of said casing and between said couple members and terminating a short distance from the upper end of the casing but below the surface of the liquid.

2. An electric heater, as claimed in claim 1, in which the vertical discharge tube is movable endwise within the casing, to enable the distance between its open upper end and the upper end of said casing, and between its said open end and the surface of the liquid, to be varied.

3. An electric heater for flowing liquids, comprising a vertically-arranged, tubular casing closed at opposite ends and provided adjacent its lower end with an inlet for the cold liquid; a plurality of electrodes disposed substantially vertically within the casing and having current-conducting means connected to their upper ends, certain of the electrodes being perforated; and an open-ended, vertical discharge tube for the heated liquid extending upwardly through the lower end of the casing and between said electrodes, and terminating a short distance below the surface of the liquid.

4. An electric heater for flowing liquids, comprising a vertical casing closed at opposite ends and provided adjacent its lower end with an inlet for the cold liquid; electric heating means within said casing; and an open-ended, vertical discharge tube for the heated liquid extending upwardly through the lower end of the casing in juxtaposition to said heating means and terminating a short distance from the upper end of said casing but below the surface of the liquid; said vertical tube being movable endwise within the casing, to enable the distance between its open upper end and the upper end of said casing, and between its said open end and the surface of the liquid, to be varied.

5. An electric heater for flowing liquids, comprising a vertical casing closed at opposite ends and provided adjacent its lower end with an inlet for the cold liquid; a plurality of electrodes within the casing having current-conducting means connected to their upper ends, certain of the electrodes being disposed at an angle to the vertical axis of the casing to cause eddying of the liquid; and an open-ended, vertical discharge tube for the heated liquid terminating at its upper end within the casing between the electrodes and a short distance below the surface of the liquid.

6. An electric heater for flowing liquids, comprising a vertical casing closed at opposite ends and provided adjacent its lower end with an inlet for the cold liquid; a plurality of electrodes within the casing having current-conducting means connected to their upper ends, certain of the electrodes being disposed at an angle to the vertical axis of the casing to cause eddying of the liquid, and certain other electrodes being perforated; and an open-ended, vertical discharge tube for the heated liquid terminating at its upper end within the casing between the electrodes and a short distance below the surface of the liquid.

7. An electric heater for flowing liquids, comprising a vertical casing closed at opposite ends and provided adjacent its lower end with an inlet for the cold liquid; a plurality of substantially vertical electrodes disposed within the casing; current conducting means connected with said electrodes; and an open-ended, vertical discharge tube for the heated liquid extending upwardly through the lower end of the casing and between the electrodes and terminating a short distance from the upper end of the casing but below the surface of the liquid, said discharge tube being movable endwise within said casing to enable the distance between its open upper end and the upper end of the casing, and between its said open end and the surface of the liquid, to be varied.

In testimony whereof I affix my signature.

RINALDO CARLO MASSERONI.